United States Patent
Keller-Tuberg (10) Patent No.: US 7,254,135 B2
(45) Date of Patent: Aug. 7, 2007

(54) FACILITATING IP-BASED MULTICASTING CONTROL CONNECTIONS

(75) Inventor: Stefan Keller-Tuberg, Raleigh, NC (US)

(73) Assignee: Alcatel, Paris (FR)

( * ) Notice: Subject to any disclaimer, the term of this patent is extended or adjusted under 35 U.S.C. 154(b) by 1133 days.

(21) Appl. No.: 10/092,061

(22) Filed: Mar. 5, 2002

(65) Prior Publication Data

US 2007/0008979 A1    Jan. 11, 2007

(51) Int. Cl.
*H04L 12/26* (2006.01)
(52) U.S. Cl. .................. 370/395.52; 370/401; 370/466
(58) Field of Classification Search ...................... None
See application file for complete search history.

(56) References Cited

U.S. PATENT DOCUMENTS 5,812,552 A * 9/1998 Arora et al. ........... 370/395.53
6,931,005 B1 * 8/2005 Wilhelm ..................... 370/390
2001/0048683 A1   12/2001 Allan
2002/0024956 A1   2/2002 Keller-Tuberg
2002/0097728 A1 * 7/2002 Hinderks et al. ...... 370/395.52

FOREIGN PATENT DOCUMENTS

| EP | 1 133 117 A2 | 9/2001 |
| EP | 1 133 117 A3 | 9/2001 |

* cited by examiner

*Primary Examiner*—Chau Nguyen
*Assistant Examiner*—Jordan Hamann
(74) *Attorney, Agent, or Firm*—Bobby D. Slaton; V. Lawrence Sewell (57) ABSTRACT

One embodiment of the disclosures made herein is an Internet Protocol (IP) multicast control system. In accordance with such IP multicast control system, the IP multicast control system includes a first module capable of facilitating IP multicast control connections between a first apparatus and a second apparatus and a second module capable of enabling termination of a control protocol of the first module. The second module is capable of being supported at an Asynchronous Transfer Mode (ATM) layer of the second apparatus.

34 Claims, 9 Drawing Sheets

FACILITATING IP-BASED MULTICASTING CONTROL CONNECTIONS

FIELD OF THE DISCLOSURE

The disclosures made herein relate generally to Internet Protocol (IP) multicast techniques and more particularly to facilitating IP-based multicasting via a hierarchical network comprising network nodes that are incapable of supporting IP layer capabilities.

BACKGROUND

In conventional implementations of Internet Protocol (IP) multicast control, such control is often performed using a node-by-node, hop-by-hop approach. In this manner, each network node in a particular network of network nodes participates in the control of IP multicast connections. It is required that each network node has awareness at an IP control layer for enabling each network node to participate in the control of IP multicast connections.

Many public and private communication networks include hierarchical networks of Asynchronous Transfer Mode (ATM) layer equipment (i.e. deployed ATM network nodes). To provide new IP-based multicast services within such networks, it is necessary to enable IP multicasting capabilities within such networks. However, it is often not be feasible or desirable to retrofit IP layer capabilities or new hardware into deployed ATM network nodes of such networks.

Insufficient memory in data processors of such deployed ATM network nodes is one reason why it would not be feasible or desirable to retrofit IP layer capabilities into deployed ATM network nodes of such networks. Such insufficient memory limits an ability to terminate an IP stack. Insufficient hardware resources for terminating additional IP connections and traffic is another reason why it is not feasible or desirable to retrofit IP layer capabilities into deployed ATM network nodes of such networks.

The cost and time associated with designing IP-based hardware capable of supporting IP-based multicast services in deployed ATM network nodes is one reason why it is often not desirable (e.g. financially practical) to retrofit such IP-based hardware into deployed ATM network nodes. Similarly, the significant cost associated with retrofitting such IP-based hardware into deployed ATM network nodes is another reason why it is often not desirable to retrofit deployed ATM network nodes with IP-based hardware. Still another reason is that a considerable duration of time and considerable coordination is required for retrofitting such IP-based hardware into a potentially large number of deployed ATM network nodes.

Therefore, facilitating centralized multicast control functionality in a hierarchical network of network elements in a manner that overcomes limitations associated with conventional implementations of IP multicasting capabilities is useful.

DETAILED DESCRIPTION OF THE FIGURES

The disclosures made herein relate to various aspects of centralizing Internet Protocol (IP) multicast control functionality. The term centralized as referred to herein means that such IP multicast control functionality is managed at a single one of a plurality of network nodes. This approach to managing control connections is in contrast to conventional multicast control approaches in which a plurality of network node participate in managing IP multicast control functionality in a node-by-node, hop-by-hop manner. It should be understood that the term centralized does not necessarily refer to a particular location of the network node or apparatus managing such IP multicast control functionality within a network. Accordingly, the network node or apparatus managing such IP multicast control functionality within a network may not be located at a central location within the network.

Embodiments of the disclosures made herein provide a feasible and practical approach to retrofitting IP multicast control capabilities into deployed network nodes that are incapable of supporting IP layer capabilities or that have insufficient IP layer resources for supporting IP multicasting control capabilities. For example, such embodiments of the disclosures made herein enable cost-effective deployment of IP multicasting capabilities in a subtending tree of network elements (e.g. Digital Subscriber Line Access Multiplexors—DSLAMS) that operate at an ATM layer. Effectively, IP functionality is simulated at the ATM layer. It is contemplated herein that the centralized IP multicast control functionality may be integrated into the root of a hierarchical tree of ATM capable network nodes (i.e. a DSLAM), at a network node external to the tree, or within tree.

Turning now to the drawing figures, a communication apparatus 100 in accordance with a first embodiment of the disclosures made herein is disclosed in FIGS. 1–4. The communication apparatus 100 includes a hub Digital Subscriber Line Access Multiplexer (DSLAM) 102, a first subtended DSLAM 104, a second subtended DSLAM 106 and a plurality of DSL subscriber apparatuses 108. Although two subtended DSLAMs are shown, it is contemplated that the communication apparatus 100 and other apparatuses in accordance with embodiments of the disclosures made herein may include fewer or more than two subtended DSLAMS. A computer system having a DSL modem connected thereto is an example of a DSL subscriber apparatus.

Figure 1:
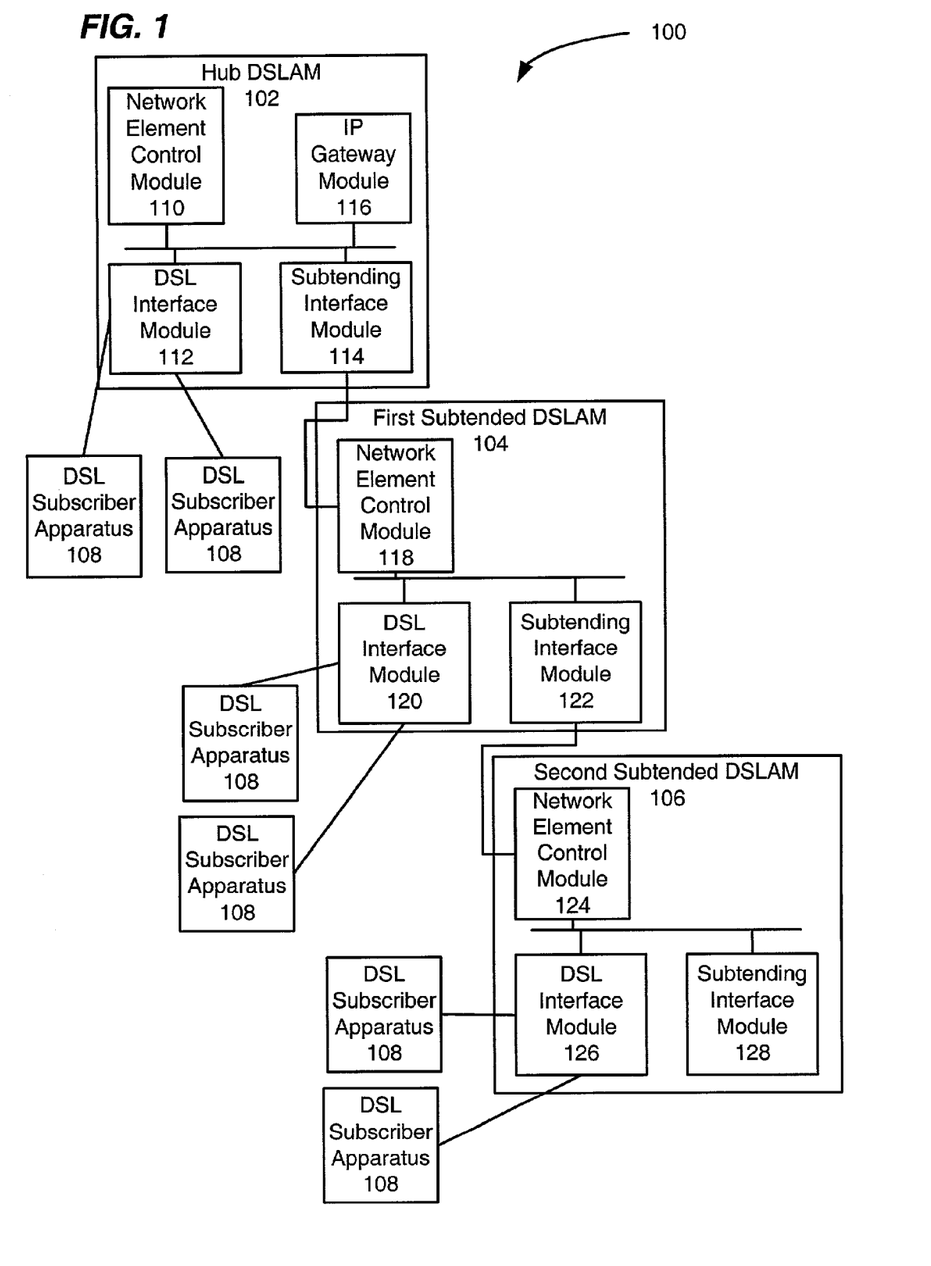
FIG. 1 is a block diagram view depicting a hierarchical network of network nodes capable of facilitating multicast control functionality in accordance with a first embodiment of the disclosures made herein.

The communication apparatus 100 depicts an example of a tree of DSLAMs being controlled by the IP gateway module 116, wherein the IP gateway module 116 is internal to the tree. The first and the second subtended DSLAMS (104, 106) define a branch of subtended DSLAMs. It is contemplated herein that one or more other branches of subtended DSLAMs (not shown) may be connected to the hub DSLAM 102.

It should be understood that that a DSLAM is one example of a network element of a network node. Accordingly, the hub DSLAM 102, the first DSLAM 104 and the second DSLAM 106 are examples of network elements of respective network nodes. Such respective network nodes may comprise one or more DSLAMs as well as other types of network elements.

The hub DSLAM 102 includes a network element control module 110, a DSL interface module 112, a subtending interface module 114 and an IP gateway module 116. The network element control module 110, the DSL interface module 112, the subtending interface module 114 and the IP gateway module 116 are interconnected for enabling communication therebetween. The network element control module 110 at least partially controls operation of various network elements (e.g. the DSL interface module 112, the subtending interface module 114 and the IP gateway module 116, etc) of the hub DSLAM 102. The DSL Interface module 112 enables communication between the hub DSLAM 102 and the plurality of DSL subscriber apparatus 108 connected to the hub DSLAM 102. The subtending interface module 114 supports communication between the hub DSLAM 102 and the first subtended DSLAM 104.

The IP gateway module 116 manages IP multicast control functionality between the hub DSLAM 102 and at least a portion of the DSLAMs that subtend from the hub DSLAM 102 (e.g. the first subtending DSLAM 104 and the second subtending DSLAM 106). Managing multicast control connections is an example of managing multicast control functionality. Furthermore, the IP gateway module 116 manages IP multicast control functionality between the hub DSLAM 102 and DSL subscriber apparatuses 108 connected to the Hub DSLAM 102 and to any subtending DSLAMs under its management. Additional details regarding the operation, implementation and advantages of an IP gateway module in accordance with embodiments of the disclosures made herein are discussed below.

The first subtending DSLAM 104 includes a network element control module 118, a DSL interface module 120 and a subtending interface module 122. The network element control module 118, the DSL interface module 120 and the subtending interface module 122 are interconnected for enabling communication therebetween. The network element control module 118 at least partially controls operation of various network elements (e.g. the DSL interface module 120 and the subtending interface module 122) of the first subtending DSLAM 104. Furthermore, the network element control module 118 of the first subtended DSLAM 104 is connected to the subtending interface module 114 of the hub DSLAM 102, thus enabling communication between the hub DSLAM 102 and the first subtended DSLAM 104. The DSL Interface module 120 enables communication between the first subtended DSLAM 104 and the plurality of DSL subscriber apparatuses 108 connected to the first subtended DSLAM 104. The subtending interface module 122 supports communication between the first subtending DSLAM 104 and the second subtended DSLAM 106.

The second subtending DSLAM 106 includes a network element control module 124, a DSL interface module 126 and a subtending interface module 128. The network element control module 124, the DSL interface module 126 and the subtending interface module 128 are interconnected for enabling communication therebetween. The network element control module 124 of the second subtended DSLAM 106 is connected to the subtending interface module 122 of the first subtended DSLAM 104, thus enabling communication between the first subtended DSLAM 104 and the second subtended DSLAM 106.

The second subtended DSLAM 106 is capable of providing multicast control functionality that is essentially identical to that of the first subtending DSLAM 104. In a first embodiment of the second subtending DSLAM 106 (shown), the architecture of the second subtending DSLAM 106 is essentially identical to that of the first subtending DSLAM 104. In a second embodiment of the second subtending DSLAM 106, the architecture of the second subtending DSLAM 106 is different than that of the first subtending DSLAM 104, although the second subtending DSLAM 106 is capable of providing multicast control functionality that is essentially identical to that of the first subtending DSLAM 104.

Figure 2:
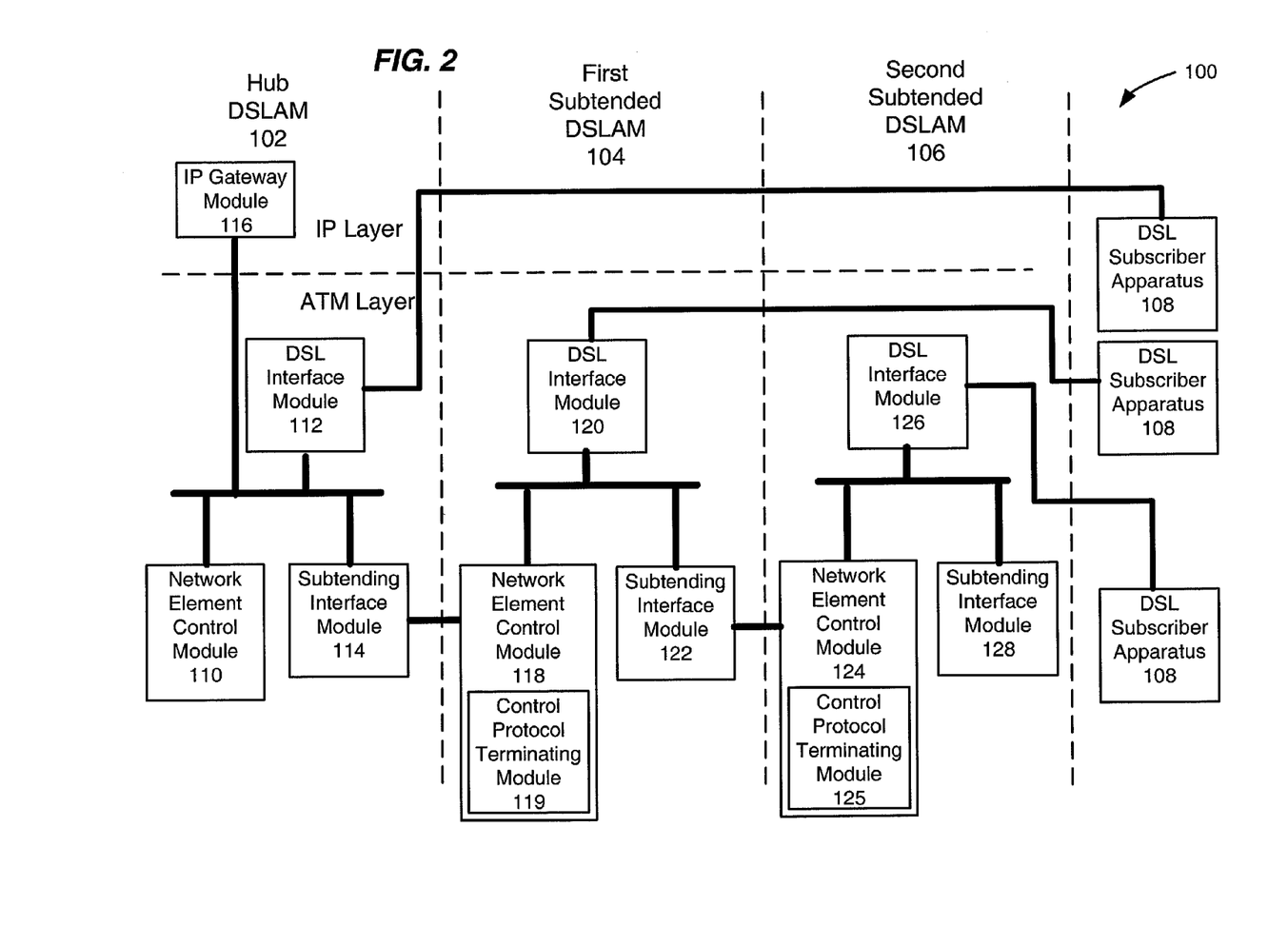
FIG. 2 is a block diagram view depicting the relationship of network elements of the hierarchical network of network nodes depicted in FIG. 1 in relation to an IP layer and an ATM layer.

As depicted in FIG. 2, the network element control modules (118, 124) of the first and the second subtended DSLAMs (104, 106) each include a respective control protocol terminating module (119, 125). Furthermore, the IP gateway module 116 is implemented at an IP layer of the hub DSLAM 102 and the control protocol terminating modules (119, 125) are each implemented at an Asynchronous Transfer Mode (ATM) layer of the first and the second subtended DSLAMs (104, 106). The control protocol terminating modules (119, 125) are capable of terminating a control protocol of the IP gateway module 116. In this manner, the IP gateway module 116 is capable managing multicast control functionality of the first and the second subtended DSLAMs (104, 106) and any other suitable configured subtended DSLAMs associated therewith.

It is contemplated herein that in other embodiments of a control protocol terminating module (not shown), the control protocol terminating module may be a separate module (e.g. a separate network element of a network node) rather than a module integrated within a network control module as depicted herein. It is further contemplated herein that functionality of a protocol terminating module in accordance with the disclosures made herein may be integrated with another module (e.g. the network element module, Subtending interface module, etc). In this manner, control protocol terminating functionality is provided without the need for a discrete or integrated control protocol termination module.

Figure 3:
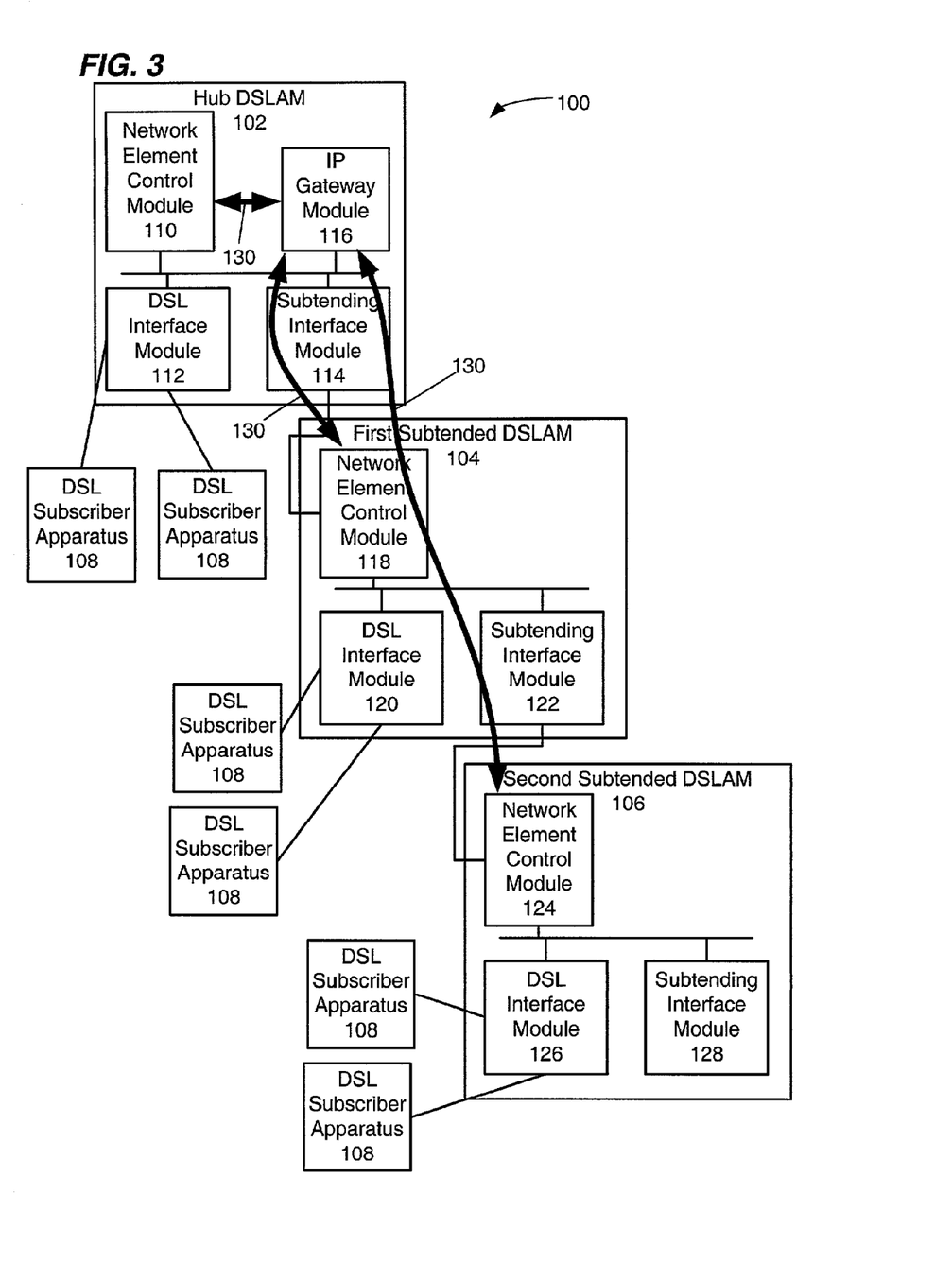
FIG. 3 is a block diagram view depicting DSLAM control connections managed by an IP gateway module of the hierarchical network of network nodes depicted in FIG. 1.

As depicted in FIG. 3, centralized multicast control functionality in accordance with the disclosures made herein enable a control connection 130 to be established between the hub DSLAM 102 and each DSLAM subtended with respect to the hub DSLAM 102 (e.g. the first and the second subtended DSLAMs 104, 106). Accordingly, the IP gateway module 116 is able to instruct the network element control modules (118, 124) of the first and the second subtended DSLAMs (104, 106) to perform functions such as establishing and clearing multicast control connections. One or more network elements of each DSLAM (e.g. network element control modules and/or subtending interface modules) participate in enabling each control connection 130 being established.

Figure 4:
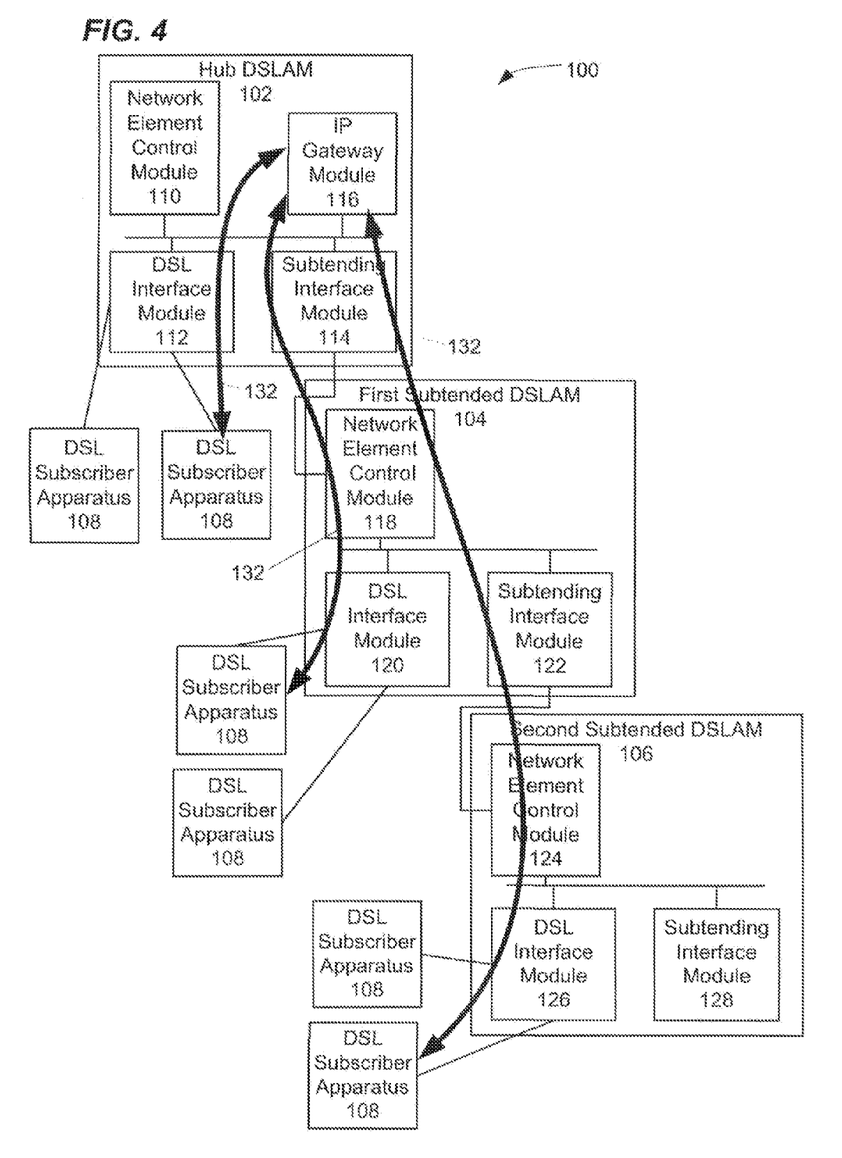
FIG. 4 is a block diagram view depicting DSL subscriber apparatus control connections managed by an IP gateway module of the hierarchical network of network nodes depicted in FIG. 1.

As depicted in FIG. 4, centralized multicast control functionality in accordance with the disclosures made herein enable control connections 132 to be established between the hub DSLAM 102 and each DSL subscriber apparatuses 108 of the communication apparatus 100 such that the DSL subscriber apparatuses 108 are able to communicate with the IP gateway module 116. One or more network elements of each DSLAM (e.g. DSL interface modules, network element control modules and/or subtending interface modules) participate in enabling each control connection 132 being established.

FIGS. 5–8 depict a communication apparatus 200 in accordance with a second embodiment of the disclosures made herein. The communication apparatus 200 includes an IP gateway apparatus 201, a hub DSLAM 202, a first subtended DSLAM 204, a second subtended DSLAM 206 and a plurality of DSL subscriber apparatuses 208. Although two subtended DSLAMs are shown, it is contemplated that the communication apparatus 200 and other apparatuses in accordance with embodiments of the disclosures made herein may include fewer or more than two subtended DSLAMS.

Figure 5:
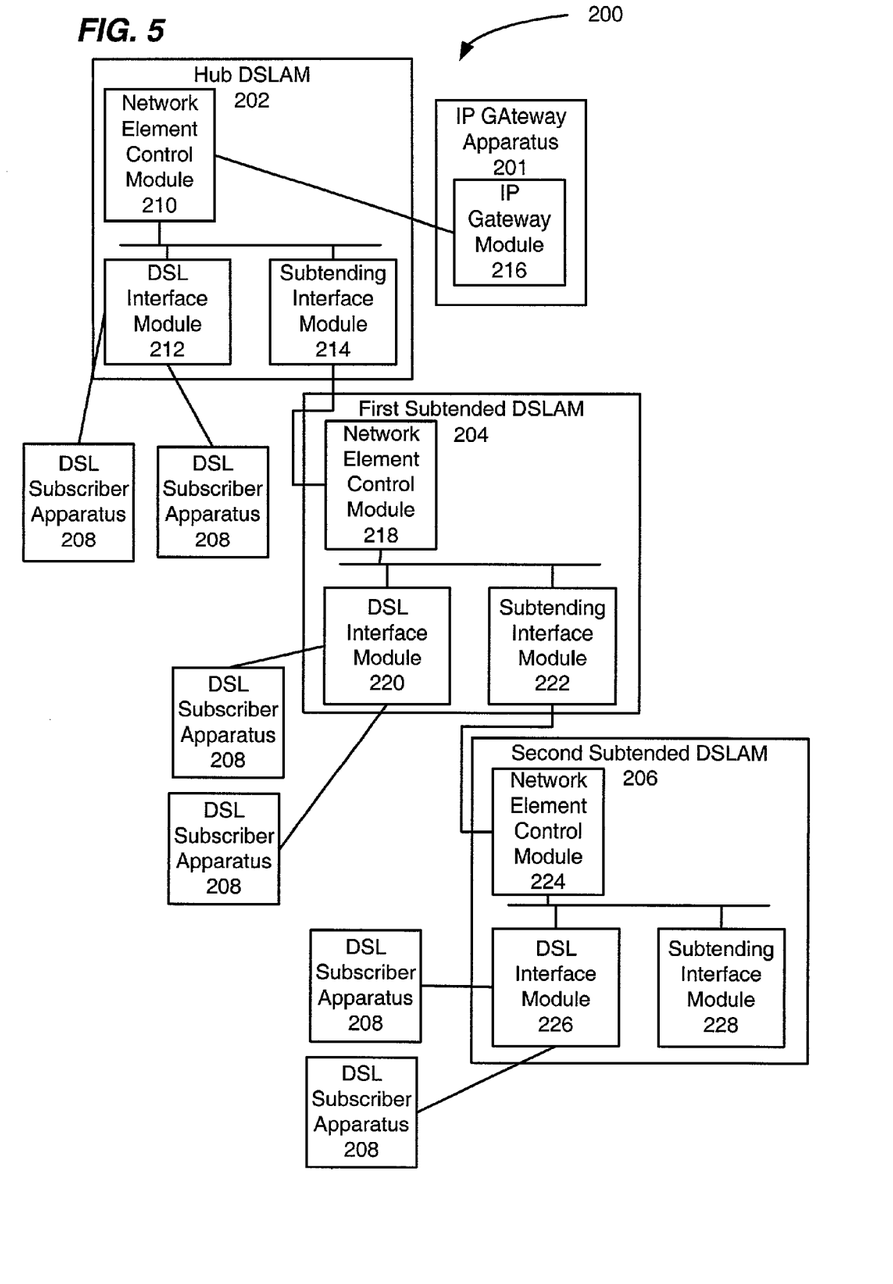
FIG. 5 is a block diagram view depicting a hierarchical network of network nodes capable of facilitating multicast control functionality in accordance with a second embodiment of the disclosures made herein.

The communication apparatus 200 depicts an example of a tree of DSLAMs being controlled by the IP gateway 201, wherein the IP gateway apparatus 201 is external to the tree. The first and the second subtended DSLAMS (204, 206) define a branch of subtended DSLAMs. It is contemplated herein that one or more other branches of subtended DSLAMs (not shown) may be connected to the hub DSLAM 202.

It should be understood that that a DSLAM is one example of a network element of a network node. Accordingly, the hub DSLAM 202, the first DSLAM 204 and the second DSLAM 206 are examples of network elements of respective network nodes. Such respective network nodes may comprise one or more DSLAMs as well as other types of network elements.

The hub DSLAM 202 includes a network element control module 210, a DSL interface module 212 and a subtending interface module 214. The network element control module 210, the DSL interface module 212 and the subtending interface module 214 are interconnected for enabling communication therebetween. The network element control module 210 at least partially controls operation of various network elements (e.g. the DSL interface module 212 and the subtending interface module 214, etc) of the hub DSLAM 202. The DSL Interface module 212 enables communication between the hub DSLAM 202 and the plurality of DSL subscriber apparatuses 208 connected to the hub DSLAM 202. The subtending interface module 214 supports communication between the hub DSLAM 202 and the first subtended DSLAM 204.

The IP gateway apparatus 201 includes an IP gateway module 216 capable of managing IP multicast control functionality between the hub DSLAM 202 and at least a portion of the DSLAMs that subtend from the hub DSLAM 202 (e.g. the first subtending DSLAM 204 and the second subtending DSLAM 206). Furthermore, the EP gateway module 216 manages IP multicast control functionality between the hub DSLAM 202 and DSL subscriber apparatuses 208 connected to the Hub DSLAM 202 and to any subtending DSLAMs under its management. The IP gateway apparatus 201 is not implemented within the tree of DSLAMs. The IP gateway apparatus 201 is a device that is capable of being a network element within or adjacent to an ATM network that is serving the subtended tree of DSLAMs. Additional details regarding the operation, implementation and advantages of an IP gateway module in accordance with embodiments of the disclosures made herein are discussed below.

The first subtending DSLAM 204 includes a network element control module 218, a DSL interface module 220 and a subtending interface module 222. The network element control module 218, the DSL interface module 220 and the subtending interface module 122 are interconnected for enabling communication therebetween. The network element control module 218 at least partially controls operation of various network elements (e.g. the DSL interface module 220 and the subtending interface module 222) of the first subtending DSLAM 204. Furthermore, the network element control module 218 of the first subtended DSLAM 204 is connected to the subtending interface module 214 of the hub DSLAM 202, thus enabling communication between the hub DSLAM 202 and the first subtended DSLAM 204. The DSL Interface module 220 enables communication between the first subtended DSLAM 104 and the plurality of DSL subscriber apparatuses 208 connected to the first subtended DSLAM 204. The subtending interface module 222 supports communication between the first subtending DSLAM 104 and the second subtended DSLAM 106.

The second subtending DSLAM 206 includes a network element control module 224, a DSL interface module 226 and a subtending interface module 228. The network element control module 224, the DSL interface module 226 and the subtending interface module 228 are interconnected for enabling communication therebetween. The network element control module 224 of the second subtended DSLAM 206 is connected to the subtending interface module 222 of the first subtended DSLAM 204, thus enabling communication between the first subtended DSLAM 204 and the second subtended DSLAM 206.

The second subtended DSLAM 206 is capable of providing multicast control functionality that is essentially identical to that of the first subtending DSLAM 204. In a first embodiment of the second subtending DSLAM 206 (shown), the architecture of the second subtending DSLAM 206 is essentially identical to that of the first subtending DSLAM 204. In a second embodiment of the second subtending DSLAM 206, the architecture of the second subtending DSLAM 206 is different than that of the first subtending DSLAM 204, although the second subtending DSLAM 206 is capable of providing multicast control functionality that is essentially identical to that of the first subtending DSLAM 204.

Figure 6:
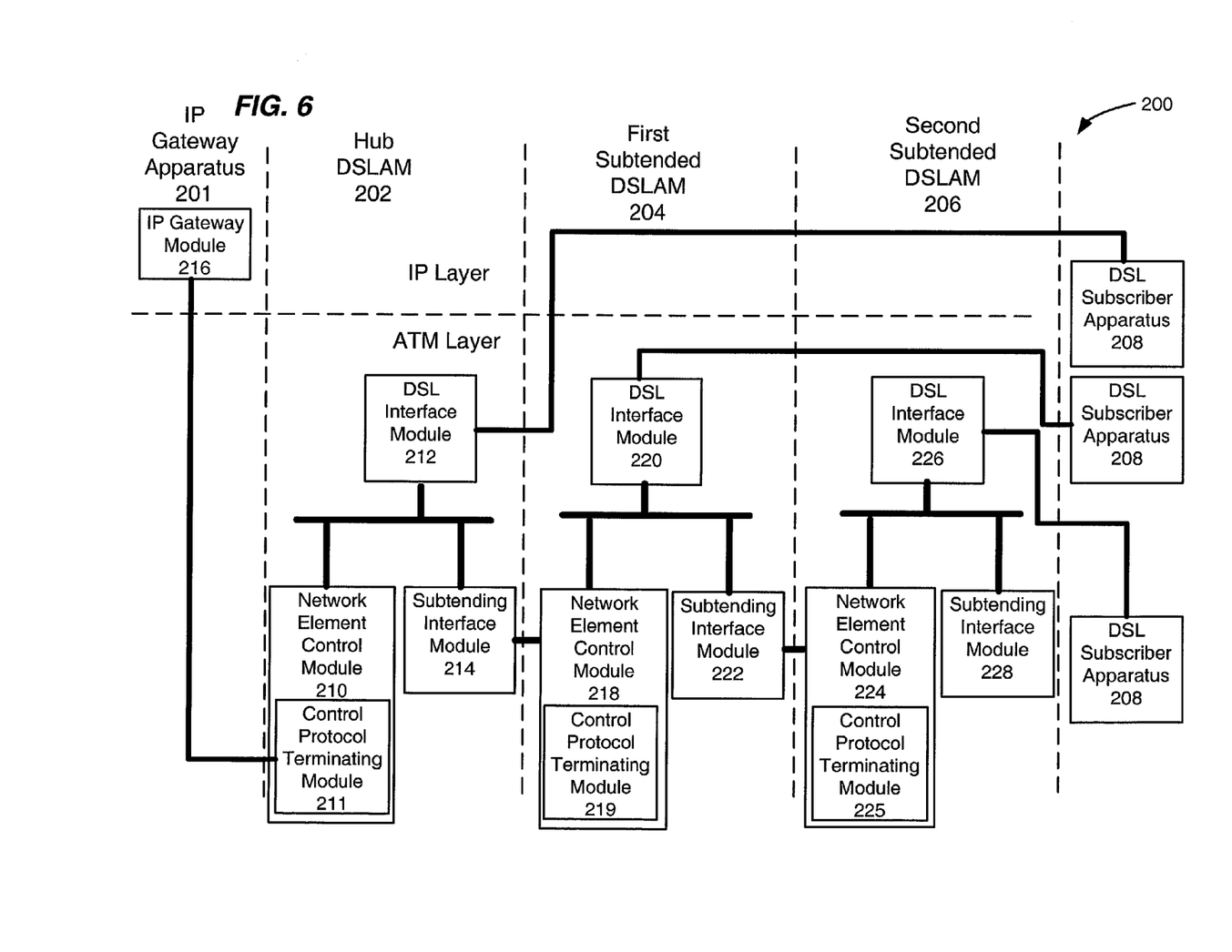
FIG. 6 is a block diagram view depicting the relationship of network elements of the hierarchical network of network nodes depicted in FIG. 5 in relation to an IP layer and an ATM layer.

As depicted in FIG. 6, the network element control modules (210, 218, 224) of the hub DSLAM 202, first subtended DSLAM 204 and the second subtended DSLAM 206 each include a respective control protocol terminating module (211, 219, 225). Furthermore, the IP gateway module 216 is implemented at an IP layer of the hub DSLAM 202 and the control protocol terminating modules (211, 219, 225) are each implemented at an Asynchronous Transfer Mode (ATM) layer of the hub DSLAM 202, the first subtended DSLAM 204 and the second subtended DSLAM 206. The control protocol terminating modules (219, 225) are capable of terminating a control protocol of the IP gateway module 216. In this manner, the IP gateway module 216 is capable managing multicast control functionality of the first and the second subtended DSLAMs (204, 206) and any other suitable configured subtended DSLAMs associated therewith.

Figure 7:
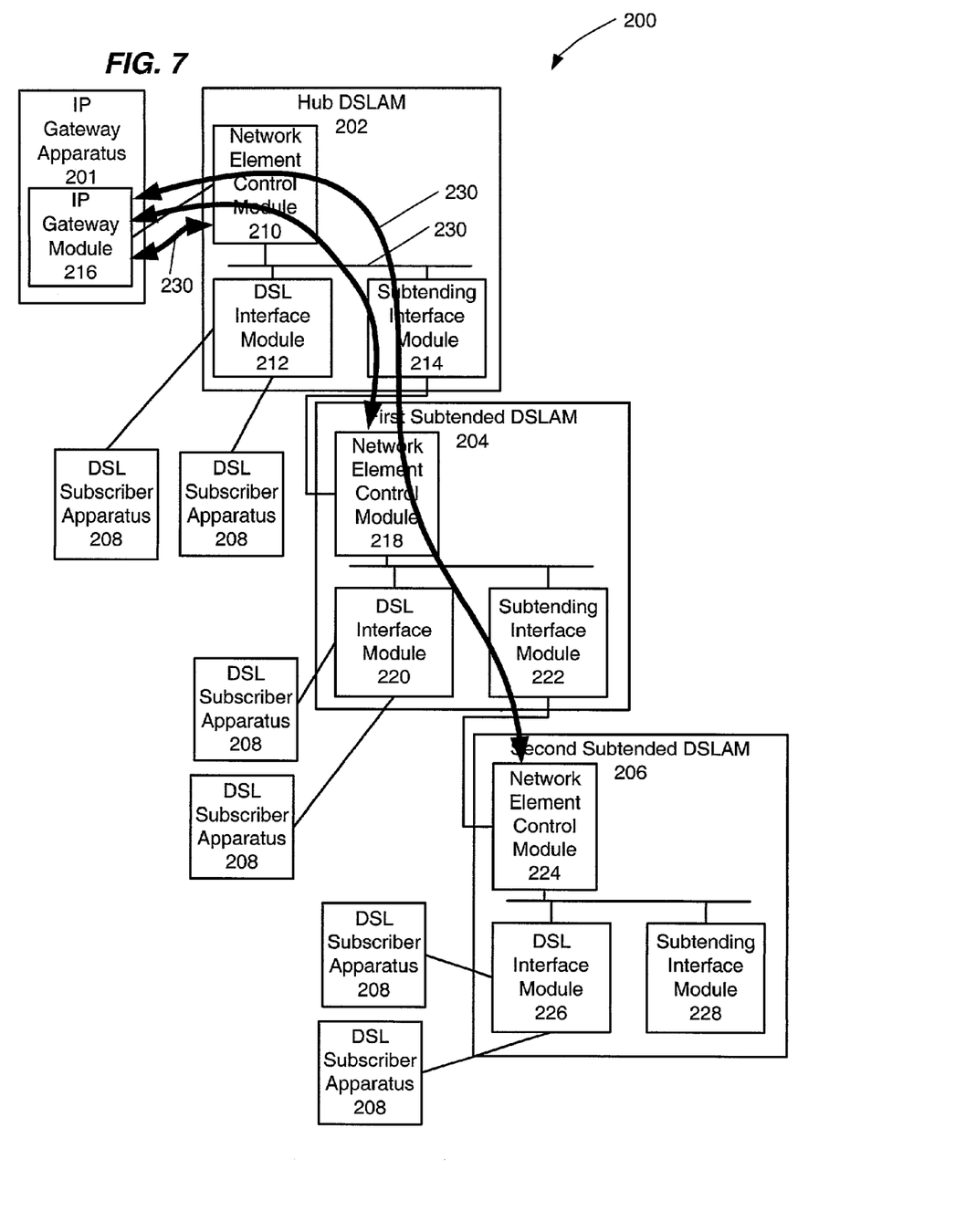
FIG. 7 is a block diagram view depicting DSLAM control connections managed by an IP gateway module of the hierarchical network of network nodes depicted in FIG. 5.

As depicted in FIG. 7, centralized multicast control functionality in accordance with the disclosures made herein enable a control connection 230 to be established between the IP gateway apparatus 201 and each one of the DSLAMS (i.e. the hub DSLAM 202, the first subtended DSLAM 204 and the second subtended DSLAM 206). Accordingly, the IP gateway module 216 is able to instruct the network element control modules (218, 224) of the hub DSLAM 202, the first subtended DSLAM 204 and the second subtended DSLAM 206 to perform functions such as establishing and clearing multicast control connections. One or more network elements of each DSLAM (e.g. network element control modules and/or subtending interface modules) participate in enabling each control connection 230 being established.

Figure 8:
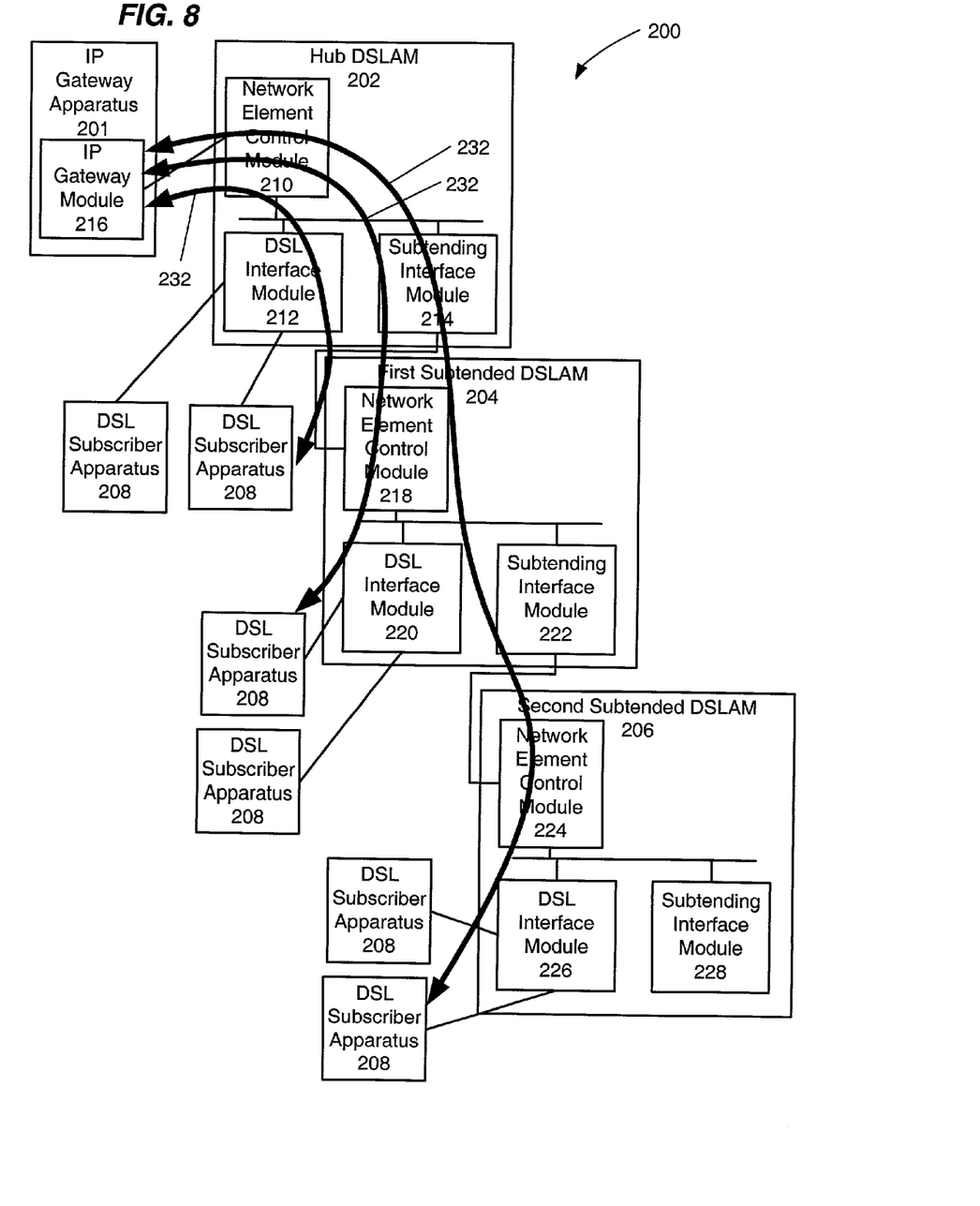
FIG. 8 is a block diagram view depicting DSL subscriber apparatus control connections managed by an IP gateway module of the hierarchical network of network nodes depicted in FIG. 5.

Furthermore, as depicted in FIG. 8, centralized multicast control functionality in accordance with the disclosures made herein enable control connections 232 to be established between the IP gateway apparatus 201 and each DSL subscriber apparatuses 208 of the tree of DSLAMs such that the DSL subscriber apparatuses 208 are able to communicate with the IP gateway apparatus module 216. One or more network elements of each DSLAM (e.g. DSL interface modules, network element control modules and/or subtending interface modules) participate in enabling each control connection 232 being established.

In accordance with at least one embodiment of the disclosures made herein, an IP gateway module and associated control protocol terminating modules each comprise one or more data processor programs implemented on existing deployed network node hardware. In accordance with at least one other embodiment of the disclosures made herein, an IP gateway module and associated control protocol terminating modules may each include respective hardware components in addition to one or more data processor programs. The term data processor program is defined herein to refer to computer software, data processor algorithms or any other type of instruction code capable of controlling operations associated with a data processor. A microprocessor, microcontroller, microcomputer, digital signal processor, state machine, logic circuitry, and/or any device that manipulates digital information based on operational instruction, or in a predefined manner are examples of a data processor. A network element (e.g. an IP gateway module, a control protocol terminating module, a network element controller, etc.) may comprise such a data processor and a data processor program in accordance with embodiments of the disclosures made herein.

It is contemplated herein that functionality associated with the various modules disclosed herein may be integrated in a one or more ancillary modules to a network element control module, a DSL interface module, a subtending interface module and an IP gateway module. Accordingly, multicast control functionality in accordance with the disclosures made herein is not limited to being provided by a single particular module.

One advantage of software of the control protocol terminating module is that its complexity and size is capable of being significantly simpler and smaller than software that would be required to implement comparable multicast control functionality in a conventional distributed (i.e. a node-by-node) manner. Because the size of the software of the control protocol terminating module is capable of being smaller and simpler with an IP Gateway based implementation in accordance with the disclosures made herein, there is greater potential that sufficient memory and processing resources may be found in the existing deployed network nodes. Accordingly, the need to retrofit hardware of the existing deployed network nodes for an IP Gateway based implementation in accordance with the disclosures made herein may be limited, if not avoided.

The IP layer and the ATM layer are examples of a first communication protocol layer and a second communication protocol layer, respectively. It is contemplated herein that multicast control functionality in accordance with the disclosures made herein may be implemented with a combination of communication protocols different than IP and ATM communication protocols. Accordingly, the disclosures made herein are not limited to IP and ATM communication protocols.

Figure 9:
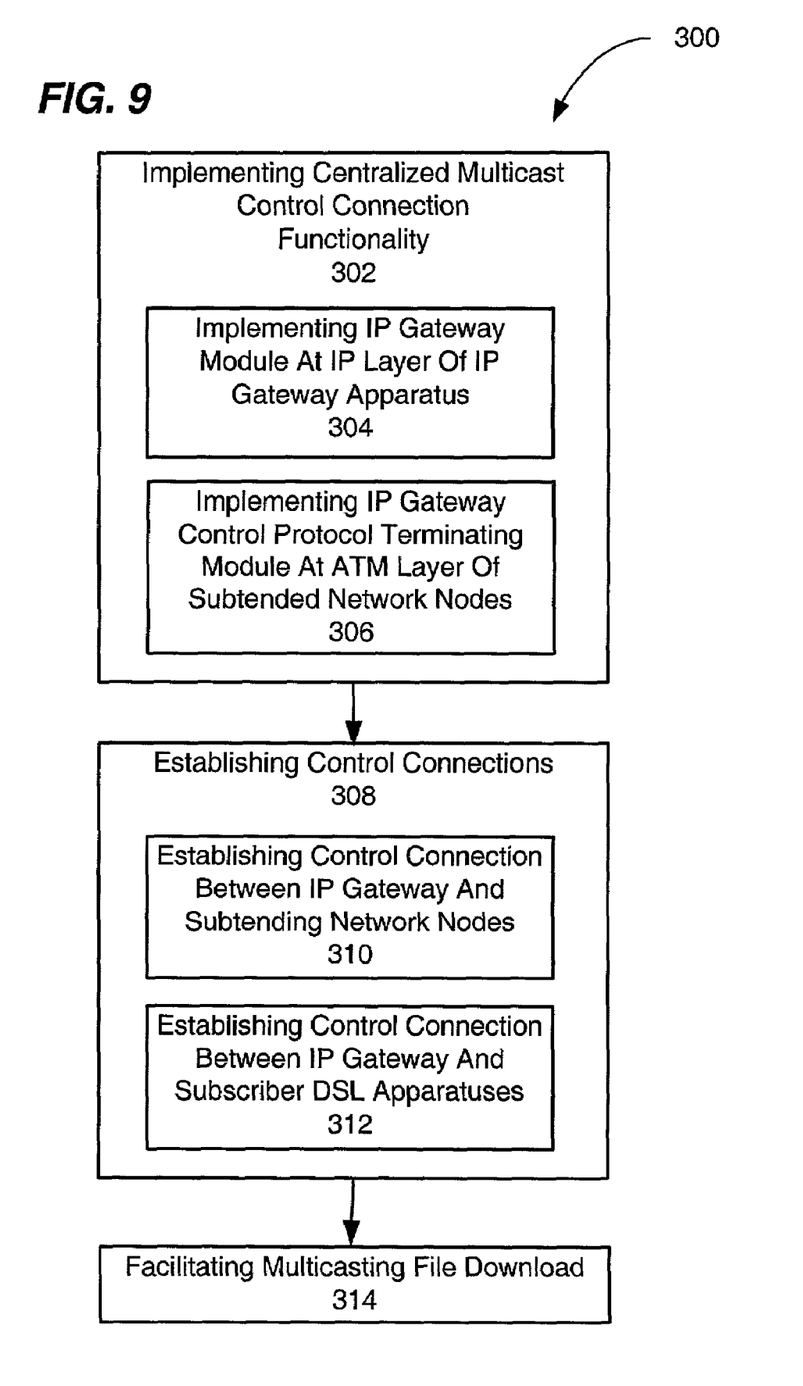
FIG. 9 is a flow diagram view depicting a method for facilitating IP multicasting functionality in accordance with another embodiment of the disclosures made herein.

FIG. 9 depicts a method 300 for facilitating IP multicasting functionality in accordance with an embodiment of the disclosures made herein. The method 300 begins at an operation 302 for implementing centralized multicast control functionality. The operation 302 for implementing centralized multicast control functionality includes performing a step 304 for implementing an IP Gateway module at an IP layer of a first network node and performing a step 304 for implementing a control protocol terminating module at an ATM layer of one or more network nodes (i.e. a second, network node, a third network node, etc) that are in subtending relationship with respect to the first network node. The one or more network nodes are referred to herein as subtending network nodes.

After performing the operation 302 for implementing centralized multicast control functionality, an operation 308 is performed for establishing control connections within the network. Accordingly, the operation 308 for establishing such control connections includes performing a step 310 for establishing a control connection between the first network node and each of the one or more subtending network nodes and performing an operation 312 for establishing a control connection between the first network node and one or more subscriber DSL apparatuses that are themselves subtending from a respective one of the subtending network nodes. After the control connections are established with the one or more subtending network nodes and the one or more Subscriber DSL apparatuses, an operation 314 is capable of being performed for facilitating multicast file download in accordance with known techniques.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An Internet Protocol (IP) multicast control system, comprising:
   a first module facilitating IP multicast control connections between a first apparatus and a second apparatus;

the first apparatus further includes:
a module controlling a plurality of network elements of the first apparatus;
a module supporting communication with at least one subtending network node of the first apparatus; and
a module supporting communication with at least one Digital Subscriber Line (DSL) apparatus; and
each one of said modules is interconnected with each other one of said modules; and
a second module enabling termination of a control protocol of the first module and supported at an Asynchronous Transfer Mode (ATM) layer of the second apparatus.

2. The system of claim 1 wherein the first module is capable of being supported at the IP layer of the first apparatus.

3. The system of claim 1 wherein the second apparatus is subtending with respect to the first apparatus.

4. The system of claim 1 wherein:
the first module is an IP Gateway Module; and
the second module is a control protocol terminating module.

5. The system of claim 1 wherein:
the first apparatus further includes:
a Network Element Control Module;
a Subtending Interface Module; and
a Digital Subscriber Line (DSL) Interface Module; and
the IP Gateway Module, the Network Element Control Module, the Subtending Interface Module and the DSL Interface Module are each interconnected.

6. The system of claim 1 wherein:
the first apparatus includes a first Digital Subscriber Line Multiplexor (DSLAM);
the first DSLAM includes an IP layer;
the IP Gateway Module is capable of being supported at the IP layer of the first apparatus; and
the IP Gateway Module is an network element of the first DSLAM.

7. The system of claim 6 wherein the second apparatus is subtending with respect to the first DSLAM.

8. The system of claim 7 wherein:
the second apparatus includes a second DSLAM; and
the Gateway Control Protocol Terminating Module is a network element of the second DSLAM.

9. The system of claim 1 wherein:
the first apparatus includes an IP Gateway apparatus including an IP layer; and
the IP Gateway Module is a network element of the IP Gateway apparatus.

10. The system of claim 9 wherein the IP Gateway Module is capable of being supported at the IP layer of the IP gateway apparatus.

11. The system of claim 9 wherein the IP gateway apparatus and the second apparatus are network nodes of a common network of network nodes.

12. The system of claim 11 wherein the common network operates in accordance with ATM.

13. The system of claim 9 wherein:
the second apparatus includes a DSLAM;
the ATM layer is integral with the DSLAM; and
the Gateway Control Protocol Terminating Module is a network element of the DSLAM.

14. The system of claim 9 wherein the IP gateway apparatus and the second apparatus are network nodes of a first network of network nodes and a second network of network nodes, respectively.

15. The system of claim 14 wherein:
the first network node operates in accordance with IP; and
the second network node operates in accordance with ATM.

16. The system of claim 9 wherein:
the second apparatus is a hub apparatus; and
a third apparatus is a subtending apparatus with respect to the hub apparatus.

17. A communication apparatus, comprising:
a first network node including an Internet Protocol (IP) Gateway Module and a Digital Subscriber Line Multiplexer (DSLAM);
the DSLAM includes an IP layer;
the IP Gateway Module is a network element of the DSLAM; and
a second network node including a Gateway Control Protocol Terminating Module;
wherein the IP Gateway Module facilitates IP multicast control connections between the first network node and the second network node and wherein the Gateway Control Protocol Terminating Module enables termination of a control protocol of the IP Gateway Module and is supported at an Asynchronous Transfer Mode (ATM) layer of the second network node.

18. The communication apparatus of claim 17 wherein the second network node is subtending with respect to the first network node.

19. The communication apparatus of claim 17 wherein the IP Gateway Module is capable of being supported at the IP layer of the DSLAM.

20. The communication apparatus of claim 17 wherein:
the DSLAM further includes:
a Network Element Control Module;
a Subtending Interface Module; and
a Digital Subscriber Line (DSL) Interface Module; and
the Network Element Control Module, the Subtending Interface Module and the DSL Interface Module are each interconnected.

21. The communication apparatus of claim 17 wherein:
the DSLAM further includes:
a module capable of controlling a plurality of network elements of the DSLAM;
a module capable of supporting communication with at least one subtending network node of the DSLAM; and
a module capable of supporting communication with at least one Digital Subscriber Line (DSL) apparatus; and
each one of said modules is interconnected with each other one of said modules.

22. The communication apparatus of claim 17 wherein the second apparatus is subtending with respect to the first DSLAM.

23. The communication apparatus of claim 22 wherein:
the first network node includes a second DSLAM; and
the Gateway Control Protocol Terminating Module is a network element of the second DSLAM.

24. The communication apparatus of claim 17 wherein:
the first network node includes an IP Gateway apparatus including an IP layer; and
the IP Gateway Module is a network element of the IP Gateway apparatus.

25. The communication apparatus of claim 24 wherein the IP Gateway Module is capable of being supported at the IP layer of the IP Gateway apparatus.

26. The communication apparatus of claim 24 wherein the IP gateway apparatus and the second apparatus are network nodes of a common network of network nodes.

27. The communication apparatus of claim 26 wherein the common network operates in accordance with ATM.

28. The communication apparatus of claim 24 wherein the first network node and the second network node are network nodes of a first network of network nodes and a second network of network nodes, respectively.

29. The communication apparatus of claim 28 wherein:
the first network node operates in accordance with IP; and
the second network node operates in accordance with ATM.

30. The communication apparatus of claim 24 wherein:
the second network node is a hub network node; and
a third network node is a subtending network node with respect to the hub network node.

31. A method for facilitating Internet Protocol (IP) multicast services within a deployed network of network elements, comprising:
implementing, at an IP layer of a first network node, functionality controlling multicast connections between the first network node and a second network node an IP Gateway control protocol, wherein the first network node includes a Subscriber Line Multiplexer (DSLAM), the IP layer is integral with the DSLAM, and implementing said functionality controlling multicast connections includes implementing said functionality at the IP layer of the DSLAM; and
implementing, at an Asynchronous Transfer Mode (ATM) layer of the second network node, functionality terminating the IP Gateway control protocol.

32. The method of claim 31 wherein implementing said functionality capable of controlling multicast connections includes coupling an IP Gateway Module with at least one of:
a Network Element Control Module,
a Subtending Interface Module; and
a Digital Subscriber Line (DSL) Interface Module.

33. The method of claim 31 wherein implementing said functionality capable of controlling multicast connections includes coupling a module capable of controlling multicast connections with at least one of:
a module capable of controlling a plurality of network elements of a first network node;
a module capable of supporting communication with at least one subtending network node of the first network node; and
a module capable of supporting communication with at least one Digital Subscriber Line (DSL) apparatus.

34. The method of claim 31 wherein:
the first network node includes an IP Gateway apparatus;
the IP layer is integral with the IP Gateway apparatus; and
implementing said functionality capable of controlling multicast connections includes implementing said functionality at the IP layer of the IP Gateway apparatus.

* * * * *